United States Patent
Tran et al.

(10) Patent No.: US 7,293,821 B2
(45) Date of Patent: Nov. 13, 2007

(54) AIRFLOW CONTROL TAILGATE

(75) Inventors: Paul Tran, 3340 Aries Ct., Santa Ana, CA (US) 92704; William H. Smedley, Kingman, AZ (US)

(73) Assignee: Paul Tran, Santa Ana, CA (US)

( * ) Notice: Subject to any disclaimer, the term of this patent is extended or adjusted under 35 U.S.C. 154(b) by 0 days.

(21) Appl. No.: 11/270,230

(22) Filed: Nov. 10, 2005

(65) Prior Publication Data

US 2007/0102959 A1    May 10, 2007

(51) Int. Cl.
   *B62D 33/03* (2006.01)
(52) U.S. Cl. ............... 296/180.1; 296/57.1; 296/180.5
(58) Field of Classification Search ............... 296/57.1, 296/50, 180.1, 180.5
   See application file for complete search history.

(56) References Cited

U.S. PATENT DOCUMENTS

| | | | |
|---|---|---|---|
| 4,165,118 A | | 8/1979 | Jensen |
| 4,201,411 A | | 5/1980 | Morgan |
| 4,867,499 A | | 9/1989 | Stephan et al. |
| 5,516,178 A | | 5/1996 | Grant |
| 5,556,152 A | * | 9/1996 | Dunlap et al. ............. 296/57.1 |
| 5,605,367 A | * | 2/1997 | Mc Cormack ............. 296/57.1 |
| 2004/0189047 A1 | | 9/2004 | Barry |

* cited by examiner

*Primary Examiner*—Dennis H. Pedder
(74) *Attorney, Agent, or Firm*—Morland C. Fischer

(57) ABSTRACT

An airflow control tailgate to be substituted for the original solid tailgate that is typically found at the rear of the body of a pick-up truck to enclose the flat bed thereof. The tailgate includes a plurality of motor controlled panels that are rotated on a respective plurality of pivot rods between a closed orientation in side-by-side alignment with one another to an open orientation in spaced, parallel alignment with one another by which to control the stream of air rushing over the cab and across the bed when the truck is in motion. A motor is coupled to the pivot rods by way of a clutch assembly and a gear rack, such that a rotation of the motor causes a linear displacement of the gear rack and a corresponding rotation of the pivot rods for rotating the panels between the closed and open orientations. One of the pivot rods carries a blocking dog which is rotated with the pivot rod relative to a blocking tab that projects from a handle in order to engage the blocking tab and thereby prevent the handle from being manipulated so that the tailgate cannot be rotated from the raised position to the lowered position when the panels are in the open orientation.

25 Claims, 5 Drawing Sheets

AIRFLOW CONTROL TAILGATE

BACKGROUND OF THE INVENTION

1. Field of the Invention

This invention relates to an airflow control tailgate to be substituted for the original solid tailgate typically found at the rear of the body of a pick-up truck to enclose the flat bed thereof. The improved tailgate includes a plurality of vertically extending, motor controlled panels that are rotatable between closed and open orientations by which to control the stream of air rushing over the cab and across the bed when the truck is in motion.

2. Background Art

A solid tailgate is commonly provided as original equipment at the rear of a pick-up truck to enclose the flat bed of the truck. Such a tailgate is rotatable from a raised position, at which to block access to the truck bed, to a lowered position, at which to permit access to the bed. With the tailgate in the raised position extending across the rear of the bed, a baffle is established to block the stream of air which rushes over the truck cab and across the flat bed. In this case, the raised tailgate introduces a wind resistance or drag which is known to reduce gas mileage and thereby adversely affect the driving efficiency of the truck. With the soaring prices of gasoline, the added costs that are incurred can be significant when a pick-up truck is operated at high speeds for long distances with the tailgate rotated to the raised position.

One attempt to overcome the problem of inefficient gas consumption is to substitute a plastic or fabric perforated closure for the conventional solid tailgate. The perforations minimize wind drag and streamline the flow of air over and past the truck. However, the driver is faced with the constant inconvenience of having to spend the time and effort to switch back and forth from the perforated closure to the original solid tailgate should the closure tear or when it is necessary for the truck bed to be fully enclosed by walls which are devoid of perforations.

Another attempt to overcome the aforementioned problem is to replace the existing tailgate with adjustable louvers, or the like, that run horizontally across the truck bed to minimize wind resistance when the truck is in motion. Examples of such louvered closures are available by referring to one or more of the following United States patents:

| U.S. Pat. No. | Date Issued |
| --- | --- |
| 4,165,118 | Aug. 21, 1979 |
| 4,201,411 | May 6, 1980 |
| 4,867,499 | Sep. 19, 1989 |
| 5,516,178 | May 14, 1996 |

SUMMARY OF THE INVENTION

In general terms, an airflow control tailgate is disclosed to be substituted for the existing solid tailgate that is typically located at the rear of the body of a pick-up truck to enclose the flat bed thereof. Like the existing tailgate, the airflow control tailgate of this invention is rotatable from a raised position, at which to block access to the truck bed, to a lowered position, at which to permit access to the bed. The tailgate includes a plurality of vertically extending, motor controlled panels having respective pivot rods by which the panels are rotated while the tailgate is in the raised position from a closed orientation, by which to establish a wind baffle to block the stream of air rushing over the cab and across the bed of the truck, to an open orientation, by which to permit the flow of air past the tailgate to the atmosphere so that wind drag will be reduced and gas mileage increased. In the closed orientation, the panels are aligned side-by-side one another across the rear of the truck bed. In the open orientation, the panels are positioned in spaced, parallel alignment with one another to establish airflow passages therebetween.

The airflow control tailgate is preferably installed at the rear of the truck bed as a unitary frame. Upper and lower frame members extend across the top and bottom of the tailgate. Side frame members of the tailgate are connected between the upper and lower frame members. The pivot rods associated with the rotatable motor controlled panels extend between the upper and lower frame members such that a rotation of the pivot rods is imparted to the panels to cause the panels to rotate around vertical axes between their closed and open orientations when the tailgate is in the raised position. A set of pulleys is mounted within the upper frame member. A cable runs over the set of pulleys, through the upper frame member, and downwardly through the side frame members for attachment at opposite ends of the lower frame member by way of pairs of serially connected latch plates and tension springs. A handle is interfaced with the cable, such that an upward pulling force applied to the handle is transmitted to the pair of latch plates via the cable to cause the latch plates to move out of engagement with respective pins at opposing sidewalls of the truck, whereby to enable the tailgate to rotate from the raised position to the lowered position. At the same time that the latch plates are moved, the springs are stressed to store energy for the purpose of urging the latches to return to their initial position at which to engage the pins.

A reversible gear motor is located within a motor box of the tailgate. Each of the control rods which rotates the motor controlled panels has a spur gear at one end thereof. The motor is coupled to the spur gears of the pivot rods at a gear rack that extends longitudinally through the lower frame member of the tailgate. A rotation of the motor causes a linear displacement of the gear rack through the lower frame member. The linear displacement of the gear rack is transferred to the spur gears, whereby to cause a corresponding rotation of the pivot rods. The rotation of the pivot rods is imparted to the motor controlled panels for causing the panels to rotate 90 degrees between their closed, side-by-side orientation to their open orientation in spaced parallel alignment with one another, or vice versa. One of the control rods of one of the motor controlled panels of the tailgate carries a blocking dog which is rotated by the control rod relative to a blocking tab that is suspended from the handle. When the panels are in their open orientation and the tailgate is in the raised position, the blocking dog and the blocking tab are aligned directly above one another to block a manipulation of the handle so that the tailgate cannot be rotated to the lowered position at which to possibly damage the panels against the rear bumper of the truck.

When the motor controlled panels are in their closed orientation and the tailgate has been rotated to the lowered position adjacent the rear bumper of the truck, a (e.g., mercury) kill switch that is carried by the tailgate will automatically disable the motor to prevent the panels from accidentally rotating to their open configuration by which to strike the rear bumper and possibly damage the panels. A safety clutch assembly is coupled to the output shaft of the motor to prevent injury to a user and damage to the tailgate should an impediment to rotation (e.g., the user's hand or a different foreign object) be accidentally placed between the motor controlled panels. The safety clutch assembly includes a clutch box that is adapted to slip and thereby permit the motor shaft to rotate, but without causing a corresponding rotation of the panels until the impediment to rotation is removed.

DESCRIPTION OF THE PREFERRED EMBODIMENT

Figure 1A:
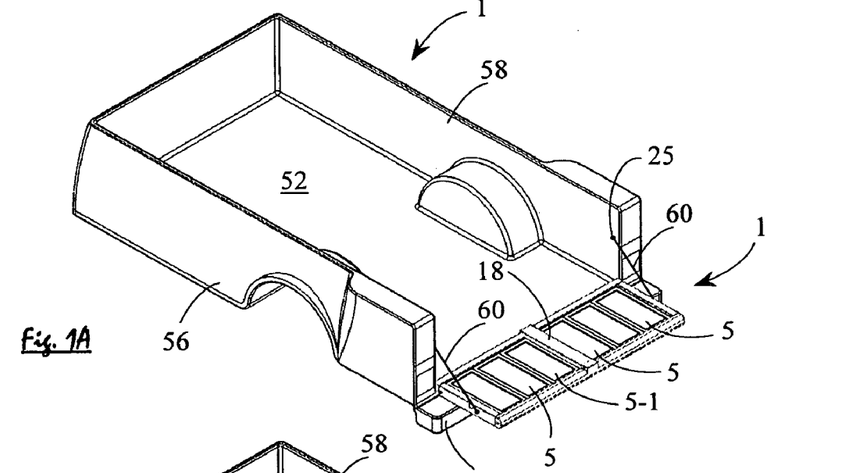
FIG. 1A shows the airflow control tailgate according to the preferred embodiment of this invention at a lowered position at the rear of a pick-up truck with motor controlled panels of the tailgate rotated to a closed orientation.
Figures 1B, 1C:
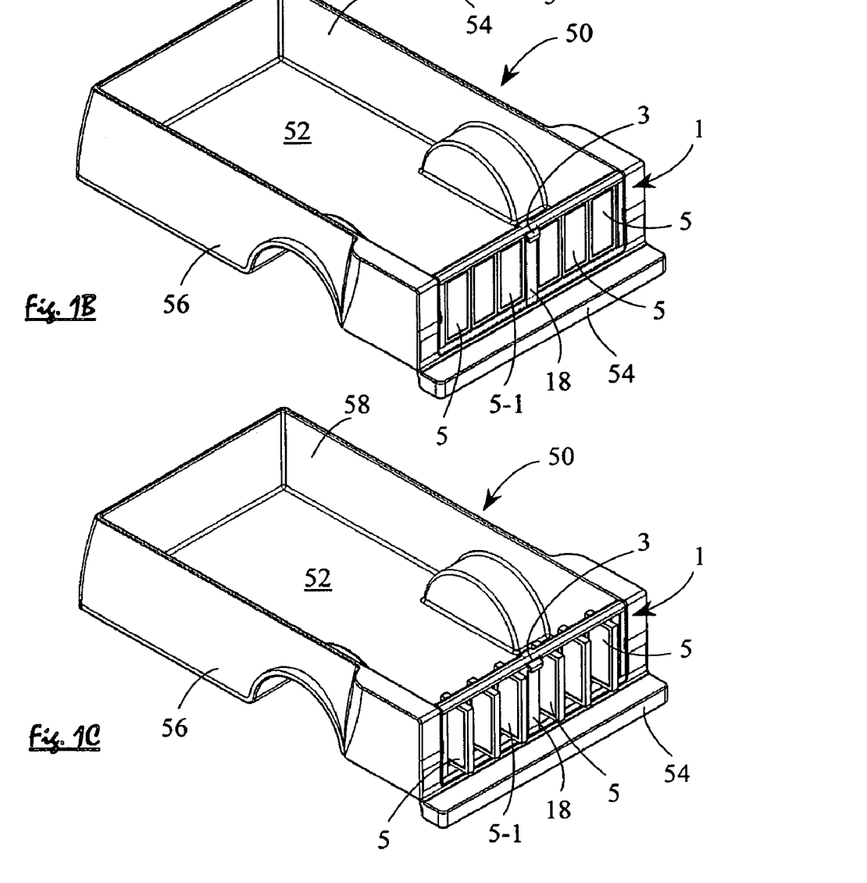
FIG. 1B shows the tailgate at a raised position with the motor controlled panels thereof in the closed orientation.
FIG. 1C shows the tailgate at the raised position with the motor controlled panels thereof rotated to an open orientation.

Referring initially to FIGS. 1A, 1B and 1C of the drawings, there is shown the airflow control tailgate 1 according to a preferred embodiment of this invention. The tailgate 1 has particular application to be substituted for the existing solid tailgate that is typically found at the rear of the body of a pick-up truck 50 to enclose the flat bed 52 extending rearwardly of the cab thereof. That is, the tailgate 50 extends above the rear bumper 54 and laterally across the rear of bed 52 between the opposing sidewalls 56 and 58 of truck 50. Like a conventional tailgate, the tailgate 1 of this invention includes a handle 3 which can be manipulated to cause tailgate 1 to be rotated through an arc of 90 degrees from a raised position (of FIG. 1B), at which to block access to the truck bed 52, to a lowered position (of FIG. 1A), at which to permit access to the truck bed 52. In this regard, and as is best shown in FIG. 1A, a pair of detachable cables 60 extend between respective sidewalls 56 and 58 of truck 50 and opposite sides of the tailgate 1 to provide support when the tailgate is rotated to the lowered position.

With the airflow control tailgate 1 rotated to the raised position of FIG. 1B, a baffle is established to block the stream of air rushing over the cab and across the bed 52 of truck 50 when the truck is in motion. Rotating the tailgate 50 to the raised position has the effect of reducing the driving efficiency of the truck 50 by increasing the wind resistance or drag and correspondingly reducing the gas mileage. To overcome this problem, and as will be described in greater detail hereinafter, the airflow control tailgate 1 includes a plurality of motor controlled panels 5 which are rotatable from a closed orientation (of FIG. 1B), at which the panels are aligned side-by-side one another across the rear of the truck bed 52, to an open orientation (of FIG. 1C), at which the panels are positioned in spaced parallel alignment with one another.

Figure 2:
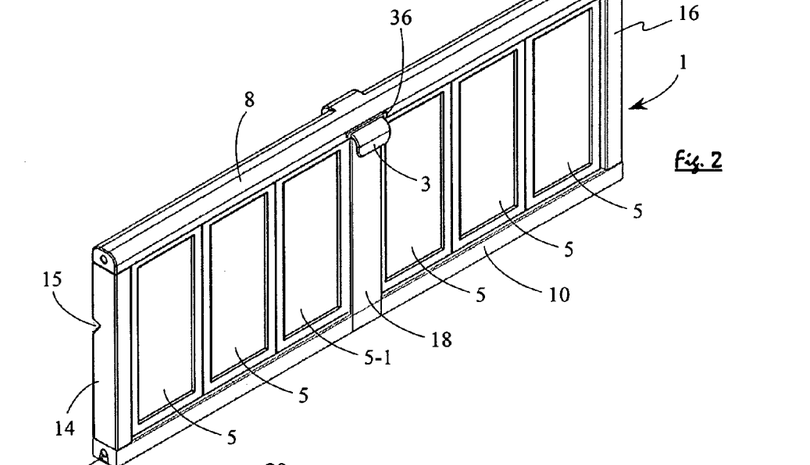
FIG. 2 is an enlargement of the airflow control tailgate of FIG. 1B with the motor controlled panels in the closed orientation.
Figures 3, 4:
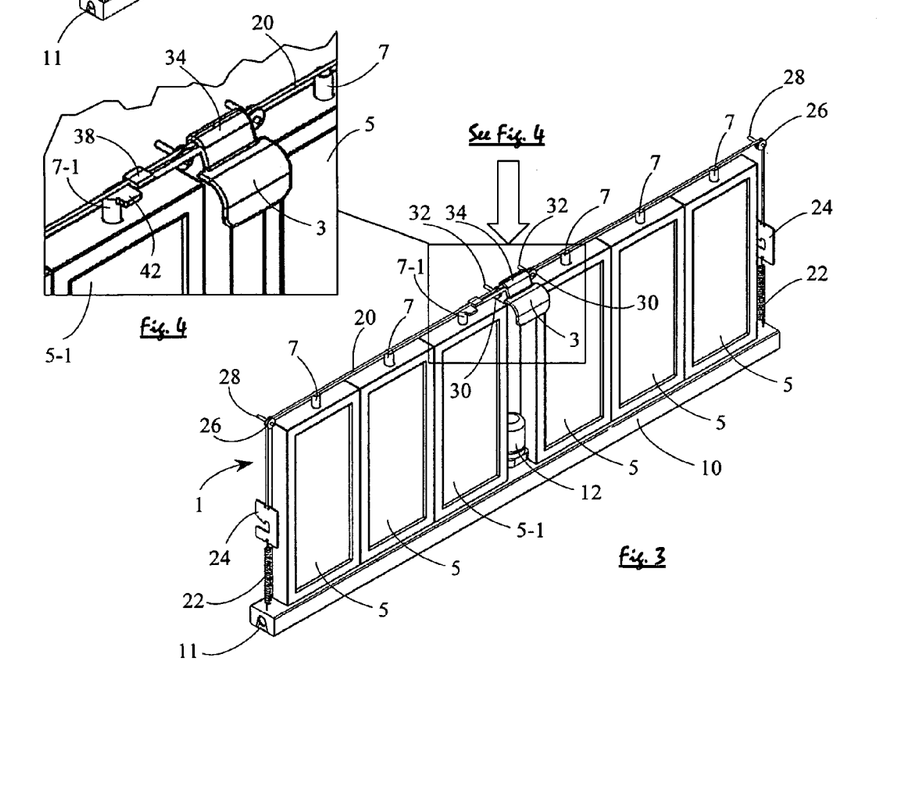
FIG. 3 shows the tailgate of FIG. 2 with a handle interfaced with a cable by which a pulling force is exerted on the cable.
FIG. 4 illustrates a detail of the tailgate in FIG. 3.
Figure 5:
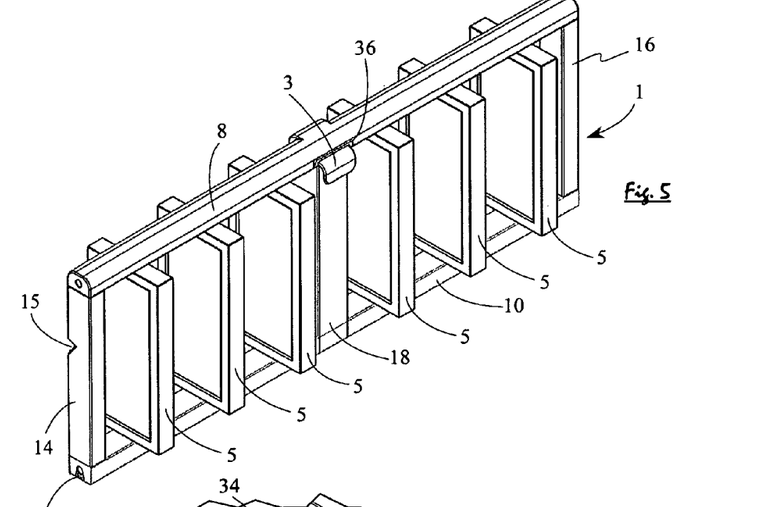
FIG. 5 is an enlargement of the airflow control tailgate of FIG. 1C with the motor controlled panels in the open orientation.
Figures 6, 7:
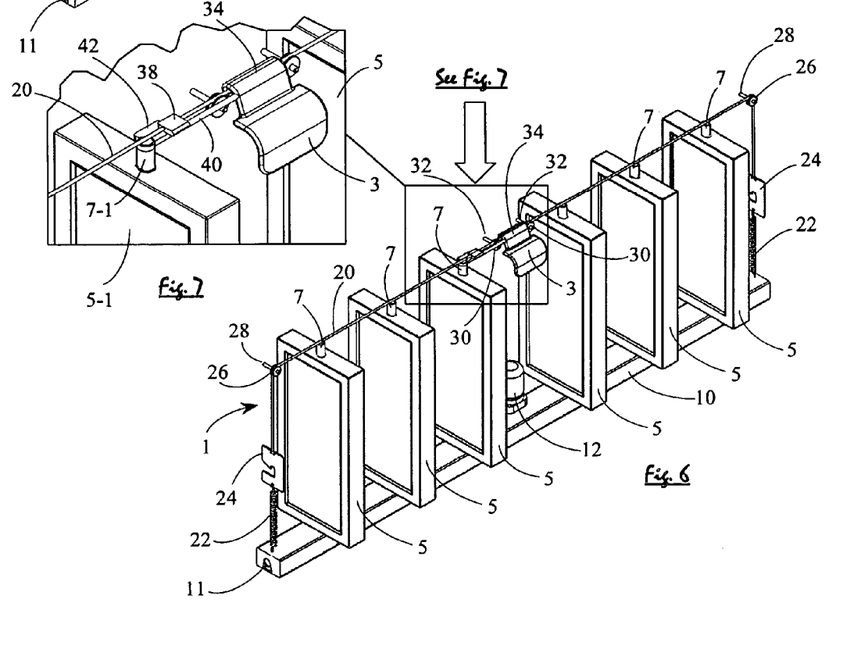
FIG. 6 shows the tailgate of FIG. 5 and the handle coupled to the cable.
FIG. 7 illustrates a detail of the tailgate in FIG. 6.

Turning now to FIGS. 2 and 3 of the drawings, details of the airflow control tailgate 1 are provided with the motor controlled panels 5 and 5-1 thereof rotated to the closed orientation so that the flat bed 52 of pick-up truck 50 of FIGS. 1A-1C is completely surrounded. It is contemplated that the tailgate 1 will be removably installed at the rear of the pick-up truck as a unitary (e.g., sheet metal) frame. To this end, each of the rotatable panels 5 is mounted on a pivot rod 7 (best shown in FIG. 3). As will be disclosed when referring to FIGS. 4 and 6, one panel 5-1 from the plurality of motor controlled panels 5 is mounted on a particular pivot rod 7-1 which carries means to prevent the tailgate 1 from rotating to the lowered position (of FIG. 1C) whenever panels 5 and 5-1 are in the open orientation (of FIG. 1C). The pivot rods 7 and 7-1 may extend completely through respective panels 5 and 5-1 or simply be integral extensions of the panels. The pivot rods 7 and 7-1 run vertically between an upper frame member 8 and a lower frame member 10 with the tailgate 1 in the raised position. A suitable motor 12 (of FIG. 3) is interfaced with the pivot rods 7 and 7-1 by way of a gearing arrangement (best shown in FIGS. 8 and 9) so as to impart a rotational force to the rods 7 and 7-1 for causing the panels 5 and 5-1 to rotate 90 degrees around vertical axes between the closed orientation as shown in FIGS. 2 and 3 and the open orientation as shown in FIGS. 5 and 6.

A slotted keyway 11 is formed in each end of the lower frame member 10. The slotted keyways 11 are sized to removably receive and capture respective pinheads (not shown) that project from the opposite sidewalls 56 and 58 of the truck 50 to establish a pivot axis around which the tailgate 1 can rotate between the raised and lowered positions. Moreover, the tailgate 1 can be simply lifted up and off the pinheads when it is desirable to remove the airflow control tailgate 1 from the rear of truck 50.

The upper and lower frame members 8 and 10 extend between and are connected to opposite side frame members 14 and 16 (of FIG. 2). Also extending between the upper and lower frame members 8 and 10 is a motor box 18 (of FIG. 2) which encloses the motor 12. A cable 20 (of FIG. 3) extends upwardly from a first attachment to the lower frame member 10, over the rotatable panels 5 and 5-1, and downwardly to a second attachment to the lower frame member 10.

As is best shown in FIG. 3, each end of the cable 20 is tied to a serially connected tension spring 22 and latch plate 24 by which the cable 20 is attached to opposite ends of the lower frame member 10. Thus, a tension spring 22 and latch 24 are enclosed by each of the side frame members 14 and 16 of tailgate 1. The latch plates 24 at the side frame members 14 and 16 of airflow control tailgate 1 are adapted to capture respective pins (designated 25 in FIG. 1) which project from the opposing sidewalls (designated 56 and 58) of truck 50 by which to hold the tailgate 1 in the raised position of FIGS. 2 and 3. The pins 25 (only one of which being visible in FIG. 1) are slidably received in detachable mating engagement with latch plates 24 by way of entrance slots (designated 15 and best shown in FIG. 2) that are formed in the side frame members 14 and 16 of tailgate 1. By manipulating the handle 3 in a manner to be described, the latch plates 24 will be moved out of their detachable engagement with the pins 25 on sidewalls 56 and 58 by which to enable the tailgate 1 to rotate to the lowered position of FIG. 1A. As the latch plates 24 are moved away from the pins 25, and as will soon be explained, the tension springs 22 will be stretched so as to store energy for the purpose of urging the latch plates 24 to return to their mating engagement with the pins 25 at sidewalls 56 and 58 when the tailgate 1 is rotated from the lowered position of FIG. 1A to the raised position of FIG. 1B.

A first pair of corner pulleys 26 (of FIG. 3) is enclosed by the upper frame member 8. The pulleys 26 are mounted at opposite ends of upper frame member 8 by respective pulley pins 28. A second pair of pulleys 30 is also enclosed by the upper frame member 8 and axially aligned with pulleys 26. The pulleys 30 are mounted on respective pulley pins 32 within the upper frame member 8 at opposite sides of the handle 3. The cable 20 extends through the opposite side frame members 14 and 16 and upper frame member 10 and over the pairs of pulleys 26 and 30 so that the cable 20 is held in a constant state of tension.

The handle 3 is manually accessible in front of the upper frame member 8 of tailgate 1. Handle 3 is linked to the cable 20 enclosed by the upper frame member 8 by means of a coupling tail 34 (of FIG. 3) that depends from the handle 3 to be wrapped around the cable 20. As is best shown in FIG. 2, the handle 3 communicates with the cable 20 through a slot 36 formed in the upper frame member 8. In this regard, an upward pulling force applied to the handle 3 causes the coupling tail 34 to rotate downwardly around a pivot axis (not shown) so as to exert a corresponding downward pushing force on cable 20. The downward pushing force is transmitted along the cable 20 to cause the tension springs 22 to stretch and the latch plates 24 (of FIG. 3) to be pulled upwardly and out of their detachable engagement with the pins 25 at the opposing sidewalls (designated 56 and 58 in FIGS. 1A-1C) of the truck 50.

The handle 3 is pulled upwardly to allow the airflow control tailgate 1 to rotate from the raised position of FIG. 1B to the lowered position of FIG. 1A. When the handle 3 is released, the downward pushing force exerted on cable 20 by the coupling tail 34 will be terminated. The springs 22 will now relax and release their stored energy, whereby the cable 20 will be pulled upwardly and the latch plates 24 will be pulled downwardly so as to return to their initial position as shown in FIG. 3 at which to capture respective pins 25.

FIG. 4 of the drawings shows an important feature of the present invention by which to prevent the airflow control tailgate 1 from being rotated to the lowered position of FIG. 1A if the panels 5 and 5-1 have been rotated to the open orientation of FIG. 1C. A blocking tab 38 is suspended from the coupling tail 34 of handle 3 by means of a blocking rod 40 extending therebetween. A blocking dog 42 is carried at the top of the pivot rod 7-1 which rotates the motor controlled panel 5-1. The position of blocking dog 42 relative to the blocking tab 38 is dependent upon the position of pivot rod 7-1 and whether the panel 5-1 is in its open or closed orientation.

With the panels 5 and 5-1 disposed in the closed orientation as shown in FIGS. 2 and 3, the blocking dog 42 carried by pivot rod 7-1 is moved to a location lying below and spaced laterally from the blocking tab 38. As previously indicated, the handle 3 is pulled upwardly and the coupling tail 34 rotates downwardly to enable tailgate 1 to be rotated to the lowered position of FIG. 1A. The upward pulling force applied to handle 3 is transferred via the coupling tail 34 and blocking rod 40 to blocking tab 38 to cause the blocking tab 38 to rotate downwardly with coupling tail 34. Inasmuch as the blocking dog 42 carried by the pivot rod 7-1 is spaced laterally from and out of the way of the blocking tab 38, the blocking dog 42 will not stop the downward rotation of blocking tab 38 and not impede the continued upward movement of handle 3 when it is desirable to rotate the tailgate 1 to the lowered position of FIG. 1A. That is to say, so long as the panels 5 and 5-1 are aligned side-by-side one another in the closed orientation illustrated in FIGS. 2 and 3, the blocking tab 38 that is suspended at the end of blocking rod 40 is free to rotate downwardly and past the blocking dog 42 that is carried by pivot rod 7-1 so as not to interfere with the upward movement of handle 3 to cause the tailgate to rotate to the lowered position.

Referring to FIGS. 5 and 6 of the drawings, the motor controlled panels 5 and 5-1 are shown rotated to their spaced, parallel aligned orientation, whereby to create a series of air passages therebetween to reduce wind drag and improve driving efficiency when the truck 50 of FIG. 1A-1C is in motion and the airflow control tailgate 1 is still in its raised position. With the panels 5 and 5-1 in the open orientation as shown, air rushing over the cab and across the bed 52 of truck 50 will flow through the air passages between the panels to the atmosphere.

The motor controlled panels 5 and 5-1 are rotated 90 degrees from the closed orientation of FIGS. 2 and 3 to the open orientation of FIGS. 5 and 6 in response to a corresponding rotation of the pivot rods 7 and 7-1 with which the panels are associated. As previously disclosed, one of the control rods 7-1 of one of the panels 5-1 carries a blocking dog 42, such that a 90 degree rotation of the pivot rod 7-1 causes a corresponding displacement of the blocking dog from its position shown in FIG. 4. Turning to FIG. 7 of the drawings, with the panels 5 and 5-1 disposed in spaced parallel alignment with one another in the open orientation, the blocking dog 42 carried by pivot rod 7-1 will lie directly below the blocking tab 38 that is suspended from the end of the blocking rod 40.

In this case, any attempt to rotate the airflow control tailgate 1 from the raised position (of FIG. 1B) to the lowered position (of FIG. 1A) will be prevented if the panels 5 and 5-1 are in their open orientation as shown in FIG. 7. That is, the arrangement of the blocking dog 42 underneath the blocking tab 38 will prevent the handle 3 from being pulled upwardly in order to enable tailgate 1 to rotate to the lowered position. In particular, as the handle 3 moves upwardly and the coupling tail 34 rotates downwardly, the blocking tab 38 that is suspended from the coupling tail 34 by means of the blocking rod 40 is likewise rotated downwardly towards the blocking dog 42.

Inasmuch as the blocking dog 42 carried by the pivot rod 7-1 is now located directly below and in the way of the blocking tab 38, the blocking dog 42 will be engaged by and block the downwardly rotation of blocking tab 38 so as to impede the further upward movement of handle 3. Accordingly, whenever the panels 5 and 5-1 are in the open orientation such that the blocking tab 38 and the blocking dog 42 are located one above the other as shown in FIG. 7, it will not be possible to pull up on the handle 3 in order to rotate the tailgate 1 to the lowered position. In this manner, the panels 5 and 5-1 will be spared damage by avoiding impact against the rear bumper (designated 54 in FIGS. 1A-1C) of the truck 50.

Figures 8, 9:
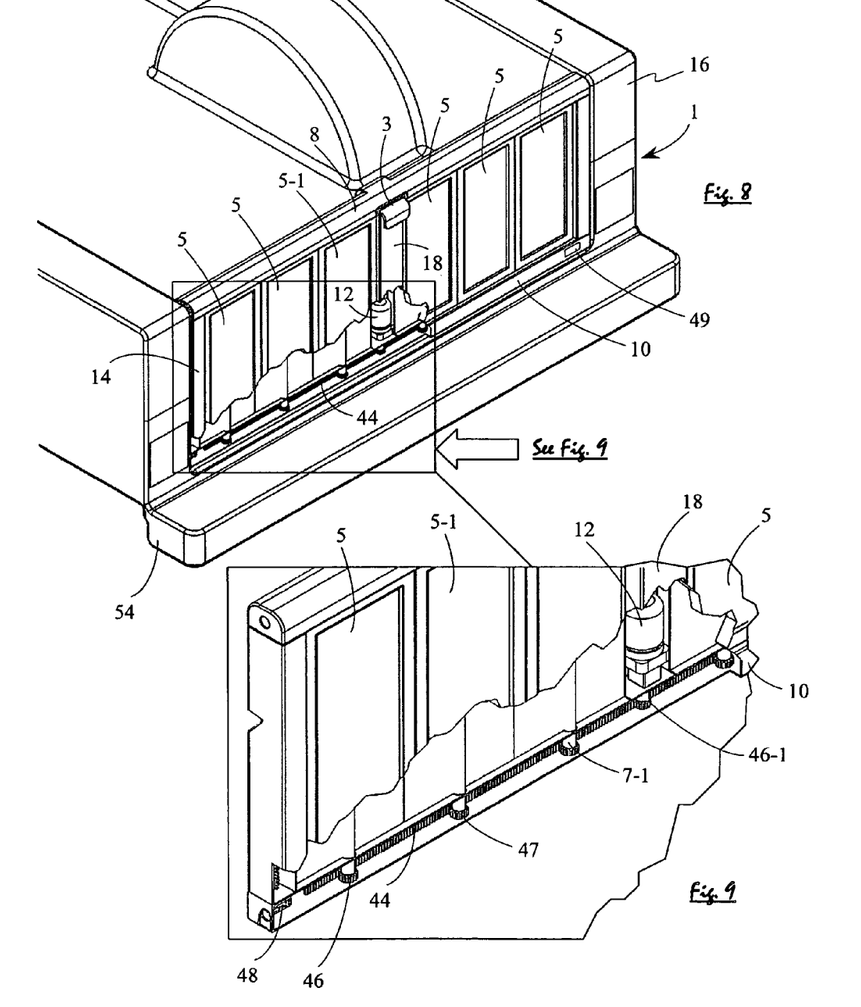
FIG. 8 shows the gearing arrangement of the tailgate by which a motor is coupled to the motor controlled panels by way of respective pivot rods.
FIG. 9 illustrates a detail of the tailgate of FIG. 8.

FIGS. 8 and 9 of the drawings show the gearing arrangement by which the motor 12 within motor box 18 causes the pivot rods 7 and 7-1 and the motor controlled panels 5 and 5-1 of the airflow control tailgate 1 to rotate 90 degrees between the open and closed orientations. A conventional reversible gear motor is suitable to achieve such a 90 degree rotation of the panels 5 and 5-1. However, a stepping motor with compatible logic may also be used where it is desirable to rotate the panels 360 degrees or less so that different messages or artwork (not shown) that is painted or printed on the front and back of the panels may be selectively displayed at different times. In this same regard, the rotation of the panels 5 and 5-1 can be selectively controlled to achieve a variety of air flow passages therebetween.

Extending longitudinally through the lower frame 10 of tailgate 1 is a gear rack 44. The gear rack 44 is interfaced with a set of spur gears 46 that are affixed to the bottoms of respective ones of the pivot rods 7 and 7-1. The output shaft of motor 12 is coupled to the gear rack 44 by means of a clutch shaft 47 and a spur gear 46-1. The clutch shaft 47 is part of a safety clutch assembly 70 to be described more fully when referring to FIGS. 10-12. Accordingly, a rotation of the motor 12 in a first direction causes a lateral displacement of the gear rack 44 in a corresponding first direction through the lower frame member 10. A rotation of the motor 12 in an opposite direction causes a lateral displacement of the gear rack 44 in a corresponding opposite direction through lower frame member 10. A suitable (e.g., 3-position, double pole double throw) switch (not shown) located in the cab of truck 50 and interfaced with the truck battery can be electrically connected to the motor 12 to control the operation and direction of rotation thereof depending on the switch position.

A lateral displacement of the gear rack 44 is translated into a rotation of the pivot rods 7 and 7-1 at the spur gears 46. As disclosed above, a rotation of the pivot rods 7 and 7-1 causes a rotation of the motor controlled panels 5 and 5-1. Accordingly, the panels 5 and 5-1 will rotate 90 degrees with respective pivot rods 7 and 7-1 between the closed and open orientations when the cab switch is operated.

The airflow control tailgate 1 may be provided with an optional pair of gear rack switches 48 and/or an optional motor kill switch 49. The optional gear rack switches 48 (only one of which being shown in FIG. 9) may be conventional micro-limit switches, or the like. The pair of gear rack switches 48 are preferably located at opposite ends of the lower frame member 10 in axial alignment with the gear rack 44. When the gear rack 44 is displaced laterally and completely through the lower frame member 10, at which time the motor controlled panels 5 and 5-1 are fully rotated 90 degrees to one of the open or closed orientations, the gear rack 44 will engage one of the gear rack switches 48, whereby to automatically disable the motor 12 and prevent any further displacement of the gear rack. Thus, the motor 12 will be unable to rotate the panels 5 and 5-1 more than 90 degrees between their open and closed orientations.

The motor kill switch 49 may be a conventional mercury switch, or the like. As is best shown in FIG. 8, the kill switch 49 is preferably located at the bottom of tailgate 1 on the lower frame member 10 thereof. When the tailgate 1 is rotated to the lowered position (of FIG. 1A), the motor 12 will be automatically disabled by the kill switch 49. Accordingly, the motor 12 will be unable to inadvertently rotate the motor controlled panels 5 and 5-1 in the manner described above whenever the tailgate 1 has been rotated to the lowered position.

Figure 10:
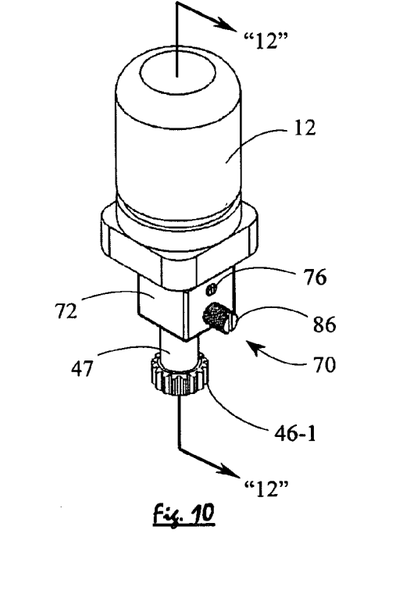
FIGS. 10-12 show a safety clutch assembly coupled to the motor of FIG. 8 to prevent injury to a user and damage to the tailgate should the user's hand or a different foreign object be located between the motor controlled panels as the panels are being rotated between their closed and open orientations of FIGS. 2 and 5.
Figure 11:
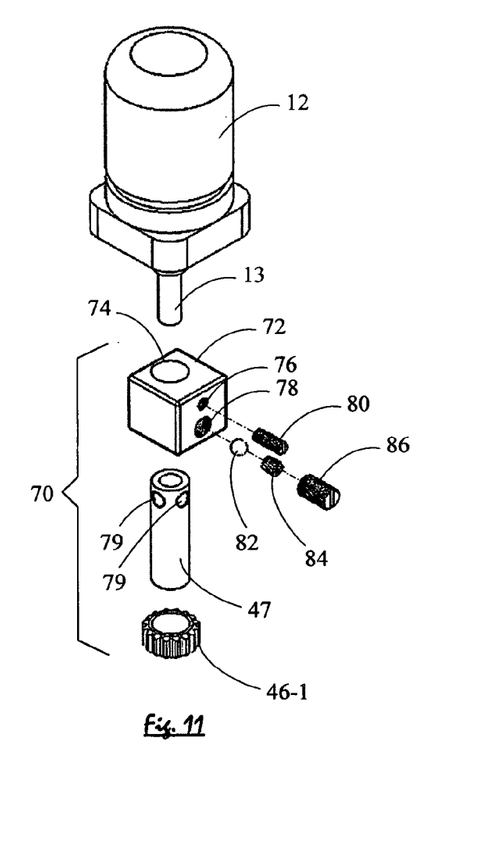
Figure 12:
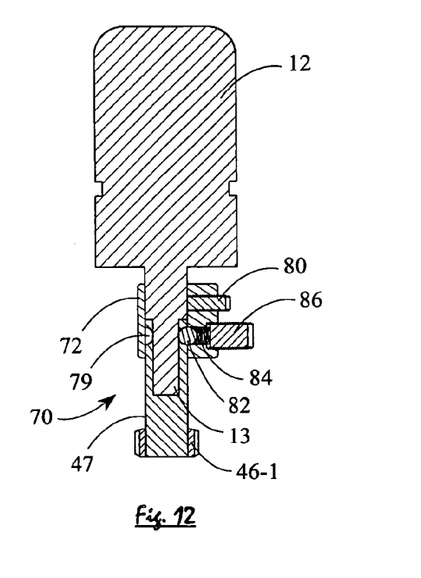

FIGS. 10-12 of the drawings show a safety clutch assembly 70 that helps to avoid injury to a user and damage to the airflow control tailgate 1 of FIGS. 1-9 in the event the user's hand or a different foreign object is accidentally inserted between any pair of the motor controlled panels 5 and 5-1 as the panels are rotated between their open and closed orientations, or vice versa. The safety clutch assembly 70 is carried by the output shaft 13 of the reversible motor 12 and is adapted to slip whenever a rotation of the panels is impeded while the motor is energized and the output shaft 13 is rotating. As just described when referring to FIGS. 8 and 9, the motor 12 is coupled to a gear rack 44 by means of a clutch shaft 47 and a spur gear 46-1 so that a 90 degree rotation of the motor shaft 13 is imparted to the motor controlled panels 5 and 5-1 by means of a linear displacement of the gear rack.

More particularly, the safety clutch assembly 70 includes a clutch box 72. The clutch box 72 has a longitudinally-extending channel 74 within which to receive the shaft 13 of motor 12, whereby the clutch box 72 surrounds the motor shaft. The motor shaft 13 extends through the channel 74 of clutch box 72 within which to be surrounded by the cylindrical clutch shaft 47. The clutch shaft 47 is attached (e.g., welded) to the spur gear 46-1 which communicates with and drives the gear rack 44 in the manner shown in FIG. 9. A plurality of (e.g., four) ball detents 79 are evenly spaced around the clutch shaft 47.

First and second threaded screw holes 76 and 78 extend through one face of the clutch box 72 so as to communicate with the longitudinally-extending channel 74 thereof. A threaded set screw 80 is inserted into the first screw hole 76 and moved into contact with the motor shaft 13 so that the clutch box 72 is attached to and rotatable with motor shaft 13. A detent ball 82 followed by a low pressure (e.g., five pound) compression spring 84 are loaded into the second screw hole 78 of clutch box 72. A threaded pressure adjusting screw 86 is then inserted into the second screw hole 78 to compress the spring 84 and urge the ball 82 into receipt by one of the ball detents 79 formed in the clutch shaft 47 (best shown in FIG. 12). The adjustment screw 86 can be tightened down against the compression spring 84 to selectively adjust the spring pressure to be exerted for urging the ball 82 into a detent 79 at which to engage the output shaft 13 of the motor 12 and thereby couple the clutch shaft 47 to the motor output shaft 13 within the clutch box 72 so that the clutch shaft 47 can rotate with motor shaft 13.

During normal operation, when there is no impediment to rotation located between any pair of the motor controlled panels 5 and 5-1, the panels are rotated between their closed and open orientations (of FIGS. 2 and 5) in response to a rotation of the motor shaft 13 which is transmitted via clutch shaft 47 and spur gear 46-1 to the gear rack 44 (of FIGS. 8 and 9) to cause a linear displacement of the gear rack 44 in a direction which corresponds with the direction in which the motor shaft 13 is rotating. However, should an obstruction to rotation be accidentally placed between a pair of the panels 5 and 5-1 during operation of the motor 12, the gear rack 44 will no longer be displaced so that the spur gear 46-1 and the clutch shaft 47 will now remain stationary relative to the still rotating motor shaft 13 and the clutch box 72 that is attached to shaft 13 by means of the set screw 80. Accordingly, the ball 82 that is being pushed against the motor shaft 13 by compression spring 84 will slip into and out of successive ones of the ball detents 79 formed in clutch shaft 47 as the clutch box 72 is rotated by motor shaft 13 relative to the clutch shaft. By virtue of the slippage of the detent ball 82 that is loaded within the screw hole 78 of clutch box 72, the motor shaft 13 may continue to rotate, but the rotational force generated thereby will not be imparted to the stationary clutch shaft 47 and the spur gear 46 so as to prevent a lateral displacement of the gear rack 44 and any additional rotation of the motor controlled panels 5 and 5-1.

Once the obstruction between the motor controlled panels 5 and 5-1 has been removed, the ball 82 will drop back into one of the ball detents 79 formed in the clutch shaft 47 so that the clutch box 72, the clutch shaft 47, and the spur gear 46-1 will all rotate with the motor shaft 13, whereby the rotational force generated by shaft 13 will once again cause a linear displacement of the gear rack 44 and a corresponding rotation of the panels.

We claim:

1. An airflow control tailgate to be located at the rear of a truck having a flat bed to control the flow of air over the truck and along the bed when the truck is in motion, said tailgate adapted to be rotated from a raised position, at which to prevent access to the truck bed, to a lowered position, at which to permit access to the truck bed, said airflow control tailgate comprising a plurality of panels mounted on and rotatable with respective ones of a plurality of pivot rods, and a motion generating device coupled to said plurality of pivot rods for rotating said pivot rods, the rotation of said pivot rods being imparted to said plurality of panels for causing said panels to rotate from a closed orientation, at which the panels are aligned side-by-side one another to block the flow of air therepast, to an open orientation, at which the panels are spaced from one another to establish airflow passages for air to flow therethrough, said plurality of pivot rods forming vertical pivot axes around which said plurality of panels are rotated 90 degrees between said closed and opened orientations when said tailgate is in the raised position.

2. The airflow control tailgate recited in claim 1, wherein said motion generating device is a motor.

3. The airflow control tailgate recited in claim 2, further comprising a gear rack by which to couple said motor to said plurality of pivot rods, such that a rotation of said motor causes a corresponding rotation of said pivot rods by way of said gear rack.

4. The airflow control tailgate recited in claim 3, wherein said motor is coupled to said gear rack for causing a linear displacement of said gear rack, said gear rack coupled to said plurality of pivot rods such that a linear displacement of said gear rack causes the corresponding rotation of said pivot rods.

5. The airflow control tailgate recited in claim 3, further comprising a motor box within which said motor is located to be coupled to said gear rack.

6. The airflow control tailgate recited in claim 1, further comprising a handle, at least one latch detachably connected to the rear of the truck to hold said tailgate in the raised position, and a cable coupled to said handle and attached to said at least one latch, such that a force applied to said handle is transmitted to said latch by way of said cable to cause said latch to be pulled out of its detachable connection with the rear of the truck and thereby permit said tailgate to rotate from the raised position to the lowered position.

7. The airflow control tailgate recited in claim 6, further comprising a return spring attached to said at least one latch, said return spring being stretched to store energy when the force is applied to said handle and said latch is pulled out of its detachable connection with the rear of the truck, said return spring releasing its stored energy when the force applied to said handle is terminated for urging said latch to return to its detachable connection with the rear of said truck.

8. The airflow control tailgate recited in claim 6, wherein each of said handle and one pivot rod from said plurality of pivot rods has an extension, said extensions interacting with one another to prevent the rotation of said tailgate from the raised position to the lowered position when said plurality of panels are in the open orientation.

9. The airflow control tailgate recited in claim 8, wherein said handle extension is a blocking tab projecting from said handle and said pivot rod extension is a blocking dog carried by and rotatable with the said one of said plurality of pivot rods, said blocking dog being rotated relative to said blocking tab when said plurality of panels are rotated to the open orientation and said tailgate is in the raised position so as to engage said blocking tab when said force is applied to said handle to thereby prevent said tailgate from rotating to the lowered position.

10. The airflow control tailgate recited in claim 1, further comprising upper and lower frame members extending laterally across the rear of the truck and opposite side frame members connected to and extending between said upper and lower frame members, said plurality of pivot rods received by said upper and lower frame members such that said plurality of panels extend vertically therebetween when said tailgate is in the raised position.

11. An airflow control tailgate to be located at the rear of a truck having a flat bed to control the flow of air over the truck and along the bed when the truck is in motion, said tailgate adapted to be rotated from a raised position, at which to prevent access to the truck bed, to a lowered position at which to permit access to the truck bed, said airflow control tailgate comprising a plurality of panels mounted for rotation on a corresponding plurality of rotatable pivot rods, the rotation of said pivot rods being imparted to said plurality of panels for causing said panels to rotate from a closed orientation, at which the panels are aligned side-by-side one another to block the flow of air therepast, to an open orientation, at which the panels are aligned in spaced, parallel alignment with one another to establish airflow passages for air to flow therethrough, a motor, and a gear rack by which to couple said motor to said plurality of pivot rods, a rotation of said motor causing a linear displacement of said gear rack, said linear displacement causing the rotation of said pivot rods, whereby to cause said plurality of panels to rotate between said closed and said open orientations.

12. The airflow control tailgate recited in claim 11, further comprising a blocking dog extending from and rotatable with one of said plurality of said pivot rods so as to be moved to a position at which to prevent the rotation of said tailgate from the raised position to the lowered position when said plurality of panels are in the open orientation.

13. The airflow control tailgate recited in claim 11, further comprising upper and lower frame members extending laterally across the rear of the truck and opposite side frame members connected to and extending between said upper and lower frame members, said plurality of pivot rods received by said upper and lower frame members such that said plurality of panels extend vertically therebetween when said tailgate is in the raised position.

14. The airflow control tailgate recited in claim 11, wherein said plurality of pivot rods establish vertical pivot axes when said tailgate is in the raised position for causing said plurality of panels to rotate 90 degrees between said closed and said open orientations.

15. The airflow control tailgate recited in claim 11, further comprising a gear rack switch electrically connected to said motor to control the operation thereof, said gear rack engaging said gear rack switch by which to disable said motor after the linear displacement of said gear rack for causing said plurality of panels to rotate from the closed orientation to the open orientation.

16. The airflow control tailgate recited in claim 11, further comprising a clutch assembly connected between said motor and said gear rack so that the rotation of said motor is transmitted to said gear rack by way of said clutch assembly to cause the linear displacement of said gear rack, said clutch assembly including a clutch box attached to and rotatable with the output shaft of said motor, a clutch shaft coupled to and rotatable with the output shaft of said motor, and a drive gear coupled to and rotatable with said clutch shaft, said drive gear being interfaced with said gear rack.

17. The airflow control tailgate recited in claim 16, wherein said clutch shaft surrounds and is attached to the output shaft of said motor at the interior of said clutch box so that a rotation of said motor is imparted to said clutch shaft.

18. The airflow control tailgate recited in claim 17, wherein said clutch shaft has a plurality of detents formed therein and extending therearound, said clutch assembly also including a detent ball to be moved into engagement with the output shaft of said motor at the interior of said clutch box by way of one of said plurality of detents formed in said clutch shaft, and pressure generating means to urge said detent ball into said one detent so as to engage the output shaft of said motor, whereby said clutch shaft is coupled to said motor output shaft.

19. The airflow control tailgate recited in claim 18, wherein the output shaft of said motor and said clutch box attached thereto are adapted to rotate relative to said clutch shaft and said drive gear in response to an obstruction to rotation being located between said plurality of panels during a rotation of said panels between said closed and said open orientations, said detent ball sliding into and out of successive ones of said plurality of detents in said clutch shaft as the output shaft of said motor rotates within said clutch shaft.

20. The airflow control tailgate recited in claim 11, further comprising a handle, a latch detachably connected to the rear of the truck to hold said tailgate in the raised position, and a cable coupled to said handle and attached to said latch, such that a force applied to said handle is transmitted to said latch by way of said cable to cause said latch to be pulled out of its detachable connection with the rear of the truck and thereby permit said tailgate to rotate from the raised position to the lowered position.

21. The airflow control tailgate recited in claim 20, further comprising a return spring attached to said latch, said return spring being stretched to store energy when the force is applied to said handle and said latch is pulled out of its detachable connection with the rear of the truck, said return spring releasing its stored energy when the force applied to said handle is terminated for urging said latch to return to its detachable connection with the rear of said truck.

22. The airflow control tailgate recited in claim 11, further comprising a motor control kill switch to control the operation of said motor, said motor control kill switch being responsive to a rotation of said tailgate to the lowered position so as to disable said motor and thereby prevent a rotation of said plurality of panels from the closed orientation to the open orientation.

23. An airflow control tailgate to be located at the rear of a truck having a flat bed to control the flow of air over the truck and along the bed when the truck is in motion, said tailgate adapted to be rotated from a raised position, at which to prevent access to the truck bed, to a lowered position, at which to permit access to the truck bed, said airflow control tailgate comprising a plurality of panels mounted on and rotatable with respective ones of a plurality of pivot rods, a motion generating device coupled to said plurality of pivot rods for rotating said pivot rods, the rotation of said pivot rods being imparted to said plurality of panels for causing said panels to rotate from a closed orientation, at which the panels are aligned side-by-side one another to block the flow of air therepast, to an open orientation, at which the panels are spaced from one another to establish airflow passages for air to flow therethrough, a handle, at least one latch detachably connected to the rear of the truck to hold said tailgate in the raised position, and a cable coupled to said handle and attached to said at least one latch, such that a force applied to said handle is transmitted to said latch by way of said cable to cause said latch to be pulled out of its detachable connection with the rear of the truck and thereby permit said tailgate to rotate from the raised position to the lowered position, each of said handle and one pivot rod from said plurality of pivot rods having an extension, said extensions interacting with one another to prevent the rotation of said tailgate from the raised position to the lowered position when said plurality of panels are in the open orientation.

24. The airflow control tailgate recited in claim 23, further comprising a return spring attached to said at least one latch, said return spring being stretched to store energy when the force is applied to said handle and said latch is pulled out of its detachable connection with the rear of the truck, said return spring releasing its stored energy when the force applied to said handle is terminated for urging said latch to return to its detachable connection with the rear of said truck.

25. The airflow control tailgate recited in claim 23, wherein said handle extension is a blocking tab projecting from said handle and said pivot rod extension is a blocking dog carried by and rotatable with the said one of said plurality of pivot rods, said blocking dog being rotated relative to said blocking tab when said plurality of panels are rotated to the open orientation and said tailgate is in the raised position so as to engage said blocking tab when said force is applied to said handle to thereby prevent said tailgate from rotating to the lowered position.

* * * * *